DELAYED GATED AUTOMATIC GAIN CONTROL

Filed Aug. 30, 1949 3 Sheets-Sheet 1

INVENTOR.
Kurt Schlesinger
BY
Norman L. Mueller
Attys

DELAYED GATED AUTOMATIC GAIN CONTROL

Filed Aug. 30, 1949 3 Sheets-Sheet 2

INVENTOR.
Kurt Schlesinger
BY
Thomas L. Mueller
Atty.

April 12, 1955 K. SCHLESINGER 2,706,220

DELAYED GATED AUTOMATIC GAIN CONTROL

Filed Aug. 30, 1949 3 Sheets-Sheet 3

INVENTOR.
Kurt Schlesinger
BY
Foorman L. Mueller
Atty

United States Patent Office 2,706,220

Patented Apr. 12, 1955

2,706,220

DELAYED GATED AUTOMATIC GAIN CONTROL

Kurt Schlesinger, Maywood, Ill., assignor to Motorola, Inc., Chicago, Ill., a corporation of Illinois Application August 30, 1949, Serial No. 113,087

2 Claims. (Cl. 178—7.3)

This invention relates generally to automatic gain control systems and more particularly to a fast acting gain control system for providing automatic contrast control in a television receiver.

In the prior art automatic gain control systems have been used to compensate for varying strength of a received signal so that a constant output is produced. Such systems are commonly used in radio receivers to produce a constant sound volume for wide variations in the strength of the received carrier signals. These systems previously used for radio are not satisfactory for use in television receivers, both because the received television signal is a complex signal including a direct current component, and because at the high frequencies used for television new disturbances are encountered which cause very fast fluctuations in signal strength.

A common cause of fast variations in the strength of the received television signals is the presence of fast moving airplanes near the television antennas. These fast fluctuations are not taken care of by static automatic gain control systems with the result that synchronization of the television receiver may be temporarily lost. Various circuits have been devised for providing fast or dynamic automatic gain control but these systems have been relatively complicated and expensive and have not been entirely satisfactory in operation. One difficulty experienced is that such systems may be fast operating in one direction (as for increasing signals), but slow acting in the other direction (as for decreasing signals), whereas for satisfactory television operation an automatic gain control system which is fast operating in both directions is required.

It is, therefore, an object of the present invention to provide an improved fast acting automatic contrast control system for a television receiver.

A further object of this invention is to provide a simple automatic contrast control system suitable for use in a very high gain television receiver, which provides the required control of the gain of the receiver for wide variations in the level of the received signal.

A still further object is to provide a fast acting automatic contrast control system which operates very fast to compensate for either increase or decrease of the level of the received signal.

A feature of this invention is the provision of an automatic contrast control system for a television receiver which includes a double triode clamper circuit which operates from the alternating current component of the video signal and which acts rapidly to adjust a gain control bias to correspond to the level of the received signal.

A further feature of this invention is the provision of an automatic contrast control system for a television receiver which provides a varying bias which is applied directly to the intermediate frequency amplifier of the receiver and which is applied in a delayed manner to the radio frequency amplifier so that full gain is provided by the radio frequency amplifier stage until the signal reaches a satisfactorily high value.

Another feature of this invention is the provision of a television receiver in which contrast is controlled by controlling the gain of the radio frequency and intermediate frequency amplifier stages with the intermediate frequency amplifier stage providing bias which acts to delay control of the radio frequency amplifier until the received signal reaches a predetermined level.

Further objects and features will be apparent from a consideration of the following description when taken in connection with the accompanying drawings in which.

In practicing the invention there is provided a television receiver which is of the superheterodyne type and which may be of any suitable standard design. The receiver includes a radio frequency amplifier stage, a first detector or mixer, a plurality of intermediate frequency amplifier stages, a detector and video amplifier for producing the composite video signal at relatively high level, and a synchronization signal separator for deriving the synchronization pulses from the composite video signal. Automatic contrast control is provided by a double triode clamper circuit which is coupled to the video amplifier for sampling the output signal therefrom. The clamper circuit is also coupled to the synchronization signal output so that the triodes are keyed by the synchronization pulses and the portion of the signal sampled includes the synchronization pulses. The clamper operates to produce a voltage which corresponds to the amplitude of the positive synchronization pulses above the alternating current axis. This operation results since the coupling of the clamper to the video amplifier eliminates the direct current component. The output voltage of the clamper is applied to the radio frequency amplifier and the intermediate frequency amplifier to reduce the gains thereof in accordance with the level of the received signal.

In order to obtain delayed gain control in the radio frequency amplifier of the receiver, the cathodes of the tubes in the intermediate frequency amplifier, which are controlled by the automatic contrast control, may be returned to ground through a resistor which provides a positive bias thereto. Due to the exclusive use of alternating current coupling between clamper and video amplifier, this positive bias may also be applied to the clamper so that the output voltage which normally varies from zero to a negative value will be shifted so that it varies from a positive to a negative value. The shifted output voltage is applied to the radio frequency amplifier through a large resistor so that the positive control voltage will not substantially affect the radio frequency amplifier. The gain of the radio frequency amplifier will not be reduced until the output voltage becomes negative, and therefore the radio frequency amplifier operates at full gain until quite strong signals are received. As the positive bias is applied both to the intermediate frequency amplifier and the clamper, it will not affect the automatic gain control action of the intermediate frequency amplifier, but only the gain control of the radio frequency amplifier will be delayed.

Figure 1:
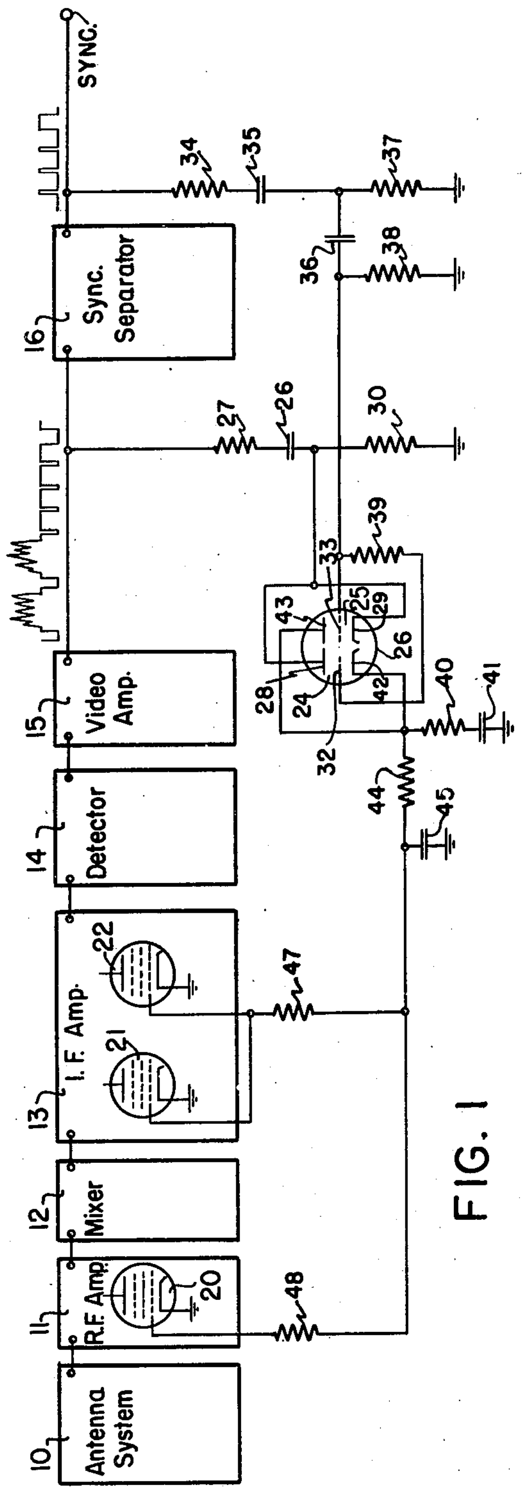
Fig. 1 illustrates a portion of a television receiver including the automatic contrast control system in accordance with the invention.

Referring now to the drawings, in Fig. 1 there is illustrated a television receiver including an antenna system 10 for intercepting and selecting very high frequency carrier waves, the received waves are further selected and amplified in radio frequency amplifier 11. The amplified carrier waves are converted to waves of intermediate frequency in mixer 12, with the intermediate frequency waves being amplified in intermediate frequency amplifier 13. The composite video signal is derived from the intermediate frequency waves by the detector 14 and further amplified in the video amplifier 15. The synchronization pulses may then be derived from the composite video signal by the synchronization signal separator 16. Although the remaining components of the television receiver are not illustrated, a sound system may be coupled either to the intermediate frequency amplifier or the video amplifier for deriving and reproducing the television sound signals and a cathode ray tube may be coupled to the video amplifier for reproducing the image reproduced by the video signal. Scanning systems may be provided for the cathode ray tube which are synchronized by the synchronization signal produced by separator 16. As these various elements may be of any standard construction and operate in the usual manner they are not illustrated herein.

For automatically controlling the contrast of the reproduced television image, the gain of the radio frequency amplifier 11 and the intermediate frequency amplifier 13 may be controlled. The radio frequency amplifier 11 is illustrated as including a pentode electron discharge valve 20 and the intermediate frequency amplifier includes two pentode valves 21 and 22. It is to be pointed out that this number is merely illustrative and additional electron discharge valves or tubes may be used in the amplifiers as desired. It is also to be pointed out that it is not necessary to control the gain of all of the valves of the radio frequency and intermediate frequency amplifiers to provide the desired contrast control. The automatic contrast control system is provided by a double triode clamper circuit including the triode sections 24 and 25 which may be included in a single envelope 26. The clamper is connected to the output of video amplifier 15 which provides a negative going video signal as illustrated. The clamper is also connected to the output of the synchronization signal separator which provides positive pulses for keying the clamper.

Connection of the clamper to the video amplifier is made through the sampling arm including resistor 27 and condenser 26 which connect to the plate 28 of the triode 24 and the cathode 29 of the triode 25. The video signal is divided by the resistors 27 and 30 so that a reduced signal (about 10 volts) is applied to the clamper. The condenser 26 is selected to provide a relatively long time constant so that the alternating current axis is not shifted by the long vertical synchronization pulses. The signal from the synchronization signal separator 16 is applied to the grid 32 of the triode 24 and the grid 33 of the triode 25 for keying the clamper. An alternating current connection is made through condenser 35, with resistors 34 and 37 dividing down the signal (to provide about 10 volts). The reduced signal is applied through condenser 36 and across resistor 38 to the grids 32 and 33, with resistor 39 being provided so that the triode 24 cannot draw grid current. When synchronization signals are produced by the separator 16, the valves 24 and 25 will be keyed so that the sample of the video signals appearing across resistor 30 will be transferred through the valves to resistor 40 and condenser 41 which are connected to the cathode 42 of the triode 24 and the plate 43 of the triode 25. The voltage across this series circuit will, therefore, correspond to the amplitude of the positive peaks of the video signal with respect to the alternating current axis of the video signal. This voltage is applied through the filter including resistor 44 and condenser 45 to the pentode valves 20, 21 and 22 of the radio frequency and intermediate frequency amplifiers.

Figure 2:
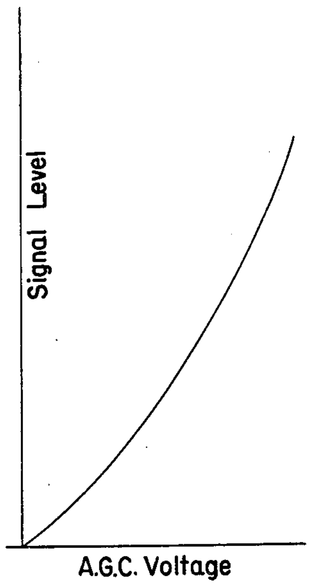
Fig. 2 illustrates the operation of the automatic contrast control system.

The automatic contrast control voltage is applied to the control grids of the tubes 21 and 22 of the intermediate frequency amplifier through resistor 47 and to the control grid of the tube 20 of the radio frequency amplifier through the resistor 48. As illustrated by Fig. 2, the automatic contrast control voltage will become increasingly larger (negative) with increase in signal level so that the tubes will be biased off to reduce the gain thereof as the signal level increases. The clamper acts as a fast acting switch to transfer changes in amplitude of the video sample across resistor 30 to the resistor 40 and condenser 41 so that the automatic contrast control bias compensates for any changes in the received signal level.

Figures 3, 4:
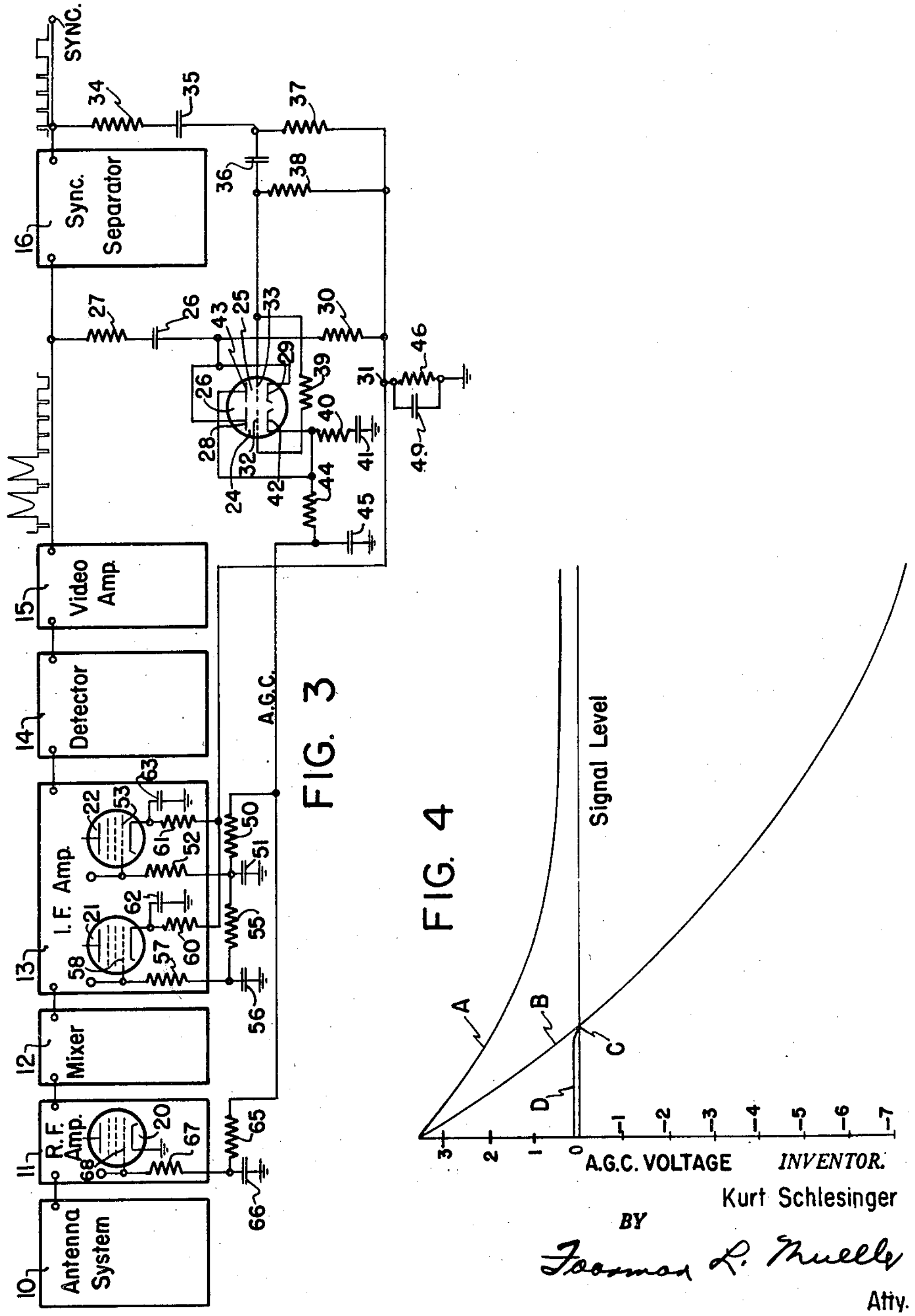
Fig. 3 illustrates another embodiment of the automatic contrast control system.
Fig. 4 illustrates the operation of the system of Fig. 3.

In Fig. 3 there is illustrated a modified circuit for providing automatic contrast control for a television receiver which is arranged so that the application of the gain reducing bias to the radio frequency amplifier stage is delayed. In Fig. 3 the same reference characters are used to indicate the components illustrated in Fig. 1, and the elements which are common to both circuits and operate in the same way in both circuits will not be again described. It is to be pointed out that in Fig. 3 the resistor 30 across which the sample of the video signal is developed and the resistor 37 across which the keying pulses are produced are not connected to ground but are connected to a point designated 31. This point is connected to ground by resistor 46 and is also connected to the cathodes of the tubes 21 and 22 of the intermediate frequency amplifier through resistors 60 and 61. Condenser 49 is bridged across resistor 46 to provide the desired time constant. The current drawn by the intermediate frequency amplifier tubes 21 and 22 therefor must pass through the resistor 46 so that a bias is developed at point 31, the value of which depends on the current through the intermediate frequency amplifier tubes. The video signal across resistor 30 is therefore added to the bias at point 31 so that the automatic contrast control voltage across resistor 40 and condenser 41 will correspond to the total voltage. The bias at point 31 will also raise the cathodes of the tubes 21 and 22 above ground, but does not affect the radio frequency amplifier tube 20.

The automatic contrast control voltage is applied to the intermediate frequency amplifier tube 22 through resistor 50 which applies the signal across condenser 51 and through resistor 52 to the grid 53 of the valve 22. Similarly the automatic gain control voltage is applied through resistor 55 across condenser 56 which is connected through resistor 57 to the control grid 58 of the tube 21. The cathodes of the tubes 21 and 22 are individually grounded through condensers 62 and 63 for signal voltages. The automatic gain control voltage is applied to the pentode valve 20 of the radio frequency amplifier through resistor 65 across condenser 66 and through resistor 67 to the grid 68 of the radio frequency amplifier valve 20. The positive bias produced at point 31 operates to render the automatic gain control voltage positive for very weak signals as will be more fully explained. The resistor 65 is very large and absorbs the positive control voltage so that it has substantially no effect on the radio frequency amplifier valve 20. The operation of the gain control voltage therefore is delayed until signals are of such strength that the gain control voltage is negative. The negative signals will reduce the gain of the radio frequency amplifier to thereby provide the desired signal level.

For a consideration of the operation of the automatic contrast control system of Fig. 3, reference should be made to Fig. 4. In this figure, curve A indicates the voltage appearing at point 31 resulting from the bias produced by the current flowing through the intermediate frequency amplifier valves 21 and 22. This bias will be a maximum when full gain is provided by the intermediate frequency amplifier. This will take place at low signal levels. As the signal level increases, the gain of the intermediate frequency amplifier valves will be decreased so that the current through the valves will decrease and the bias at point 31 will decrease. This is illustrated by the curve A of Fig. 4. The video signal applied to the clamper across resistor 30 will be added to the bias at point 31 and the total voltage applied to the plate 28 of the triode 24 and the cathode 29 of the triode 25. This voltage will be transferred to the cathode 42 of the triode 24 and the plate 43 of triode 25 when the triodes conduct. The voltage produced across resistor 30 will increase with the signal so that the voltage on the cathode 42 and plate 43 will be substantially equal to the bias at point 31 for no signal and will deviate from this bias voltage by an increasing amount as the level of the received signal increases. This is illustrated by curve B of Fig. 4.

As the cathodes of the valves 21 and 22 of the intermediate frequency amplifier are connected to point 31 and are biased by the voltage at this point, the gain control voltage applied to the grids of these valves will in effect be decreased by the bias at point 31. This is represented in Fig. 4 by the difference between the curves A and B. That is, a negative bias is applied to the intermediate frequency amplifier valves for reducing the gain of the valves with increasing signal level. This causes the current through the valves to decrease and the potential at point 31 to decrease as previously stated and as illustrated by curve A. The valve 20 of the radio frequency amplifier is not biased by the voltage of point 31 but is at ground. Therefore, the control voltage applied to the valve 20 will be positive until the signal level reaches a predetermined value identified in Fig. 4 as C. The positive potential applied for signal levels below this value is absorbed by the large resistor 65 so that the positive potential applied to the valve 20 is only of the order of one-tenth of a volt and has no substantial effect. This is illustrated by curve D. Therefore, the radio frequency amplifier will operate at full gain for weak signals so that the received signal is greatly amplified in the radio frequency amplifier stage. For such signals the control of the signal level produced in the intermediate frequency amplifier is sufficient to hold the contrast of the picture at the desired level. However, when very strong signals are received, it is desired that the amplification of the radio frequency amplifier stage be reduced so that the signals applied to the intermediate frequency amplifier are at values over which the valves amplify linearly. As the signal may be of relatively large amplitude when applied to the second intermediate frequency amplifier valve 22, it may be desired to use a remote cut-off tube in this stage to prevent distortions which result in loss of half tones on weak signals.

The valves 24 and 25 of the clamper circuit are keyed or rendered conducting only when pulses of sufficient amplitude are applied from the synchronization signal separator 16. Therefore the valves are rendered conducting only when the vertical and horizontal synchronization pulses are present in the received video signals. This is effective to reduce the effect of noise on the automatic gain control signal. That is, the signal from which the automatic gain control voltage is developed is only a small portion of the entire signal, and is the portion having maximum amplitude so that the effect of noise with respect to this portion of the signal is a minimum. The amplitude of the automatic contrast control bias is therefore quickly adjusted to correspond to the amplitude of the synchronization pulses with respect to the alternating current axis.

Figure 5:
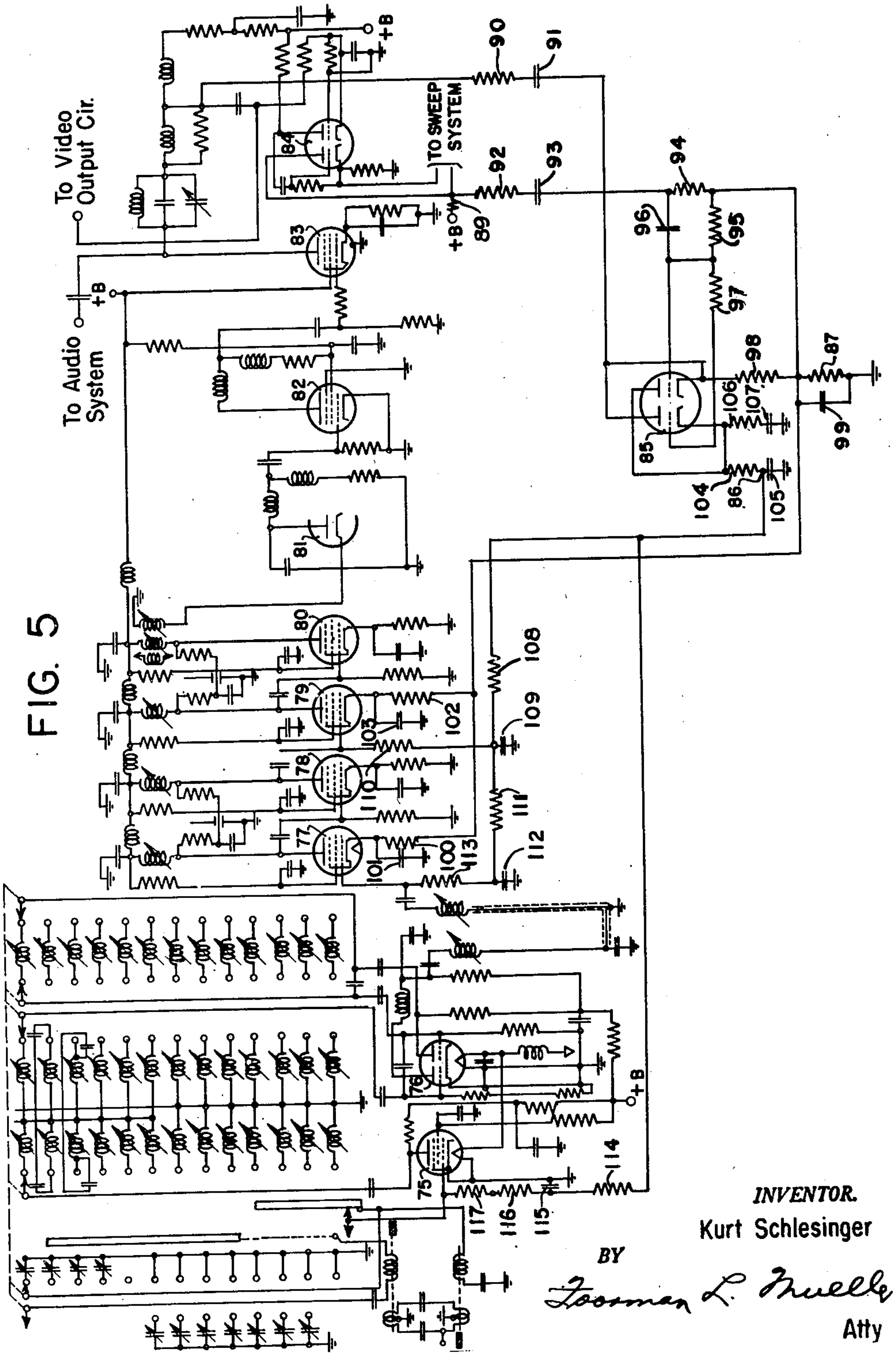
Fig. 5 is a detail circuit diagram illustrating a commercial television receiver circuit utilizing the invention.

In Fig. 5 there is illustrated more in detail a television receiver circuit incorporating the automatic contrast control system in accordance with the invention. This receiver includes a radio frequency amplifier stage 75, an oscillator-mixer stage 76, an intermediate frequency amplifier including the stages 77, 78, 79 and 80, a detector 81, a video amplifier including stages 82 and 83, and a clipper 84. The double triode clamper circuit 85 provides automatic contrast control for the television receiver in the manner explained above. The automatic contrast control potential is applied from point 86 of the clamper circuit to the control grids of the valves 77 and 79 of the intermediate frequency amplifier and to the control grid of the valve 75 of the radio frequency amplifier stage. The cathodes of the intermediate frequency amplifier valves 77 and 79 are connected to ground through resistor 87 which develops a delay bias as previously described. The clamper circuit 85 and the coupling of this circuit to the other stages of the receiver are exactly the same as described in connection with Fig. 3 and will not be repeated. Fig. 5 serves to show the application of the automatic contrast control system in a commercial receiver circuit with the gain control being applied to two of four stages in the intermediate frequency amplifier and being applied in a delayed manner to the radio frequency amplifier stage. The second intermediate frequency amplifier stage to which the gain control bias voltage is applied (tube 79) is a remote cut-off tube to provide satisfactory gain control at high signal levels.

The following components were used in the receiver of Fig 5 as tested and used. It is to be pointed out that these values are only furnished as an illustration and various other values as well as various modifications of the circuit can be provided.

| | |
|---|---|
| Radio Frequency amplifier tube **75** | 6AG5 |
| Intermediate frequency amplifier **77** | 6AG5 |
| Intermediate frequency amplifier **79** | 6BA6 |
| Video amplifier **83** | 6V6 |
| Synchronization signal clipper **84** | 12AU7 |
| Double triode **85** | 12AU7 |
| Plus B potential ______volts | 280 |
| Resistor **89** ______ohms | 6800 |
| Resistor **90** ______do | 82,000 |
| Condenser **91** ______microfarads | .1 |
| Resistor **92** ______ohms | 82,000 |
| Condenser **93** ______microfarads | .005 |
| Resistor **94** ______ohms | 10,000 |
| Resistor **95** ______megohm | 1 |
| Condenser **96** ______micromicrofarads | 100 |
| Resistor **97** ______ohms | 100,000 |
| Resistor **98** ______do | 12,000 |
| Resistor **87** ______do | 470 |
| Condenser **99** ______microfarads | 10 |
| Resistor **100** ______ohms | 100 |
| Condenser **101** ______microfarads | .001 |
| Resistor **102** ______ohms | 100 |
| Condenser **103** ______microfarads | .001 |
| Resistor **104** ______ohms | 47,000 |
| Condenser **105** ______microfarads | .02 |
| Resistor **106** ______ohms | 10,000 |
| Condenser **107** ______microfarads | .02 |
| Resistor **108** ______ohms | 10,000 |
| Condenser **109** ______micromicrofarads | 2500 |
| Resistor **110** ______ohms | 10,000 |
| Resistor **111** ______do | 10,000 |
| Condenser **112** ______micromicrofarads | 2500 |
| Resistor **113** ______ohms | 10,000 |
| Resistor **114** ______megohms | 2.7 |
| Condenser **115** ______microfarads | .001 |
| Resistor **116** ______ohms | 220,000 |
| Resistor **117** ______do | 220,000 |

The automatic contrast control system described provides very fast acting gain control of the desired stages in a television receiver. When the synchronization pulses are applied from the clipper, the two triodes of the clamper permit the condenser to charge or discharge to adjust to the value of the signal being received. The control voltage therefore adjusts rapidly in either direction to compensate for either increasing or decreasing the signal level. In circuits actually tested the operation is sufficiently fast to compensate for fluctuation in the signal caused by moving airplanes which is normally referred to as "airplane flutter." As the triodes are normally non-conducting the automatic gain control is not substantially affected by noise. The clamping triodes are keyed from the synchronization pulses themselves and not from the sweep system so that it is not necessary to consider the phasing of sweep systems with respect to the synchronization pulses. As both the video signal and the synchronization pulses are applied to the clamper circuit through alternating current couplings, it is possible to provide a bias to the clamper which may be effective to delay the effect of the gain control voltage to one or more stages. In the systems shown the clamper and the intermediate frequency amplifier stages are biased so that the action of the gain control voltage on the intermediate frequency stages is not affected by the bias, but the action of the automatic gain control voltage on the radio frequency stage amplifier is delayed by the automatic gain control voltage.

Although certain embodiments of the invention have been described which are illustrative thereof, it is obvious that various modifications and changes can be made therein without departing from the intended scope of the invention as defined in the appended claims.

I claim:

1. In a television receiver adapted to produce an image from a receiver carrier wave modulated by a composite video signal including synchronization pulses, and which receiver includes a radio frequency amplifier having at least one electron discharge valve including a control grid and a cathode and with the cathode connected to a point of reference potential, an intermediate frequency amplifier having at least one electron discharge valve having a cathode and a control grid, a video amplifier having an output circuit providing a video signal including negative going synchronization pulses, and synchronization signal separating means, and with said components being connected in cascade in a superheterodyne television receiver circuit; a system for controlling the contrast of the reproduced image including in combination, first resistance means connecting the cathode of one electron discharge valve of said intermediate frequency amplifier to said point of reference potential for providing a bias across said resistance means which is positive with respect to said reference potential and which varies with the current through said intermediate frequency amplifier, first condenser means having one side thereof connected to said reference potential, gating means having first and second terminals with means for providing a conductive path therebetween and a control terminal for controlling the conductivity of said path, a circuit including second condenser means connecting the output circuit of the video amplifier to said first terminal of said gating means, second resistance means connecting said first terminal of said gating means to said first resistance means at a point thereon remote from said reference potential so that the video signal at said first terminal of said gating means is superimposed on said positive bias, direct current connecting means connecting said second terminal of said gating means to the other side of said first condenser means, means connecting the synchronization signal separating means to said control terminal of said gating means for applying synchronization pulses thereto, with said gating means being rendered conducting during coincidence of the synchronization pulses in the video signal at said first terminal thereof and synchronization pulses at said control terminal, so that said first condenser means is charged to a voltage corresponding to the synchronization pulses of the video signal superimposed on said positive bias, first filter means connecting said first condenser means to the grid of said one electron discharge valve of the intermediate frequency amplifier for controlling the gain thereof, and second filter means including a series resistor connecting said first condenser means to the grid of said one valve of said radio frequency amplifier, said positive bias operating to delay the gain control action on said valve of said radio frequency amplifier so that the gain thereof is reduced only after said video signal exceeds a predetermined value.

2. The system for controlling the contrast of the reproduced image in a television receiver in accordance with claim 1 wherein said gating means includes first and second triode electron discharge valves each having a cathode, an anode, and a control grid, with said cathode of said first valve and said anode of said second valve being connected to said first terminal of said gating means, said anode of said first valve and said cathode of said second valve being connected to said second terminal of said gating means, and said control grids of said first and second valves being connected to said control terminal of said gating means, and in which positive synchronization pulses are applied from the synchronization signal separating means to said control terminal and to said control grids of said first and second valves.

References Cited in the file of this patent

UNITED STATES PATENTS

| | | |
|---|---|---|
| 2,046,141 | Wilhelm et al. | June 30, 1936 |
| 2,106,207 | Crossley et al. | Jan. 25, 1938 |
| 2,135,599 | Peterson | Nov. 8, 1938 |
| 2,144,224 | Koch | Jan. 17, 1939 |
| 2,144,920 | Holst | Jan. 24, 1939 |
| 2,200,049 | Van Loon | May 7, 1940 |
| 2,223,982 | Bedford | Dec. 3, 1940 |
| 2,307,375 | Blumlein et al. | Jan. 5, 1943 |
| 2,335,265 | Dodington | Nov. 30, 1943 |
| 2,356,140 | Applegarth | Aug. 22, 1944 |
| 2,356,141 | Applegarth | Aug. 22, 1944 |
| 2,436,890 | Higinbotham | Mar. 2, 1948 |
| 2,438,947 | Rieke et al. | Apr. 6, 1948 |
| 2,467,486 | Krumhansl et al. | Apr. 19, 1949 |
| 2,488,606 | Sands | Nov. 22, 1949 |
| 2,520,989 | Wilkerson | Sept. 5, 1950 |
| 2,559,038 | Bass | July 3, 1951 |
| 2,589,927 | Crane et al. | Mar. 18, 1952 |
| 2,639,939 | Wissel et al. | Apr. 28, 1953 |

FOREIGN PATENTS

| | | |
|---|---|---|
| 100,569 | Australia | Mar. 17, 1937 |